US006041868A

United States Patent [19]

Matus et al.

[11] Patent Number: 6,041,868

[45] Date of Patent: Mar. 28, 2000

[54] MECHANISM FOR CONTROLLING IMPLEMENT POSITION

[75] Inventors: Janusz W. Matus, LaGrange; Mark D. Klassen, Lockport; R. David Price, Fort Wayne, all of Ill.

[73] Assignee: Case Corporation, Racine, Wis.

[21] Appl. No.: 08/988,257

[22] Filed: Dec. 10, 1997

[51] Int. Cl.[7] .................. A01B 63/111

[52] U.S. Cl. .................. 172/2; 172/315; 338/134

[58] Field of Search .................. 172/4, 2, 239, 172/315, 316; 74/553; 200/11 TW; 338/163, 175, 134; 280/43.23, 414.5

[56] References Cited

U.S. PATENT DOCUMENTS

| | | | |
|---|---|---|---|
| 1,578,988 | 3/1926 | Hardy | 338/134 |
| 2,786,122 | 3/1957 | Strain | 338/134 X |
| 2,881,295 | 4/1959 | Brown | 338/134 X |
| 2,950,455 | 8/1960 | Brown | 338/134 |
| 3,015,793 | 1/1962 | Fraser et al. . | |
| 3,187,118 | 6/1965 | Butler et al. | 338/134 X |
| 3,427,680 | 2/1969 | Gilbert . | |
| 3,469,225 | 9/1969 | Wood . | |
| 3,534,315 | 10/1970 | De Nicola | 338/134 X |
| 4,107,859 | 8/1978 | Keith | 172/4 X |
| 4,120,364 | 10/1978 | Wooldridge | 172/2 |
| 4,343,365 | 8/1982 | Rajagopal et al. | 172/4 |
| 5,231,892 | 8/1993 | Haight | 74/523 |
| 5,261,495 | 11/1993 | Szymczak | 172/2 |

FOREIGN PATENT DOCUMENTS

| | | |
|---|---|---|
| 0 196 622 | 12/1992 | European Pat. Off. . |
| 0 494 516 | 7/1995 | European Pat. Off. . |
| 0 590 992 | 4/1996 | European Pat. Off. . |

*Primary Examiner*—Christopher J. Novosad
*Attorney, Agent, or Firm*—Jansson, Shupe, Bridge & Munger, Ltd.

[57] ABSTRACT

A mechanism for controlling raised and lowered positions of a hitch-mounted implement includes a rotatable control knob coupled to a transducer, e.g., a potentiometer, for movement between first and second positions representing the raised and lowered positions, respectively, of the implement. The control knob has a button for locking the mechanism in the implement-transport position and for other purposes. A position knob includes a tang-like stop for limiting rotation of the control knob toward the second position. The position knob thereby “sets” a lowered position of the implement which is somewhat above the lowest possible position of the implement. The position knob may be rotated to locate the stop anywhere between two barriers which set the overall limits of travel of the control knob. Most preferably, the position knob is clamped between a barrier member and a console surface and is frictionally inhibited from rotating.

8 Claims, 6 Drawing Sheets

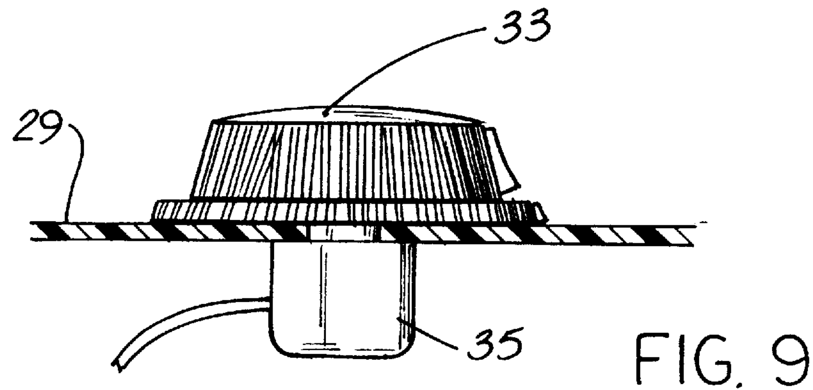
FIG. 9
FIG. 14
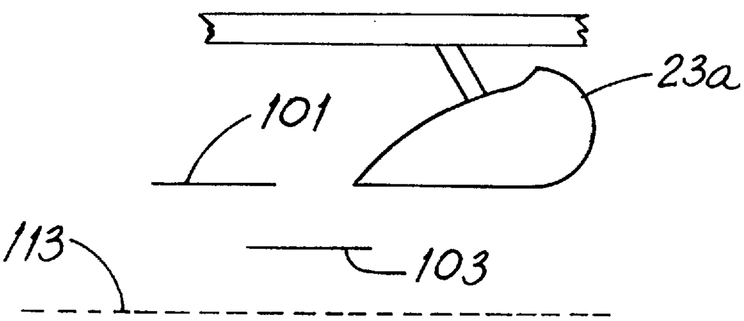
FIG. 15
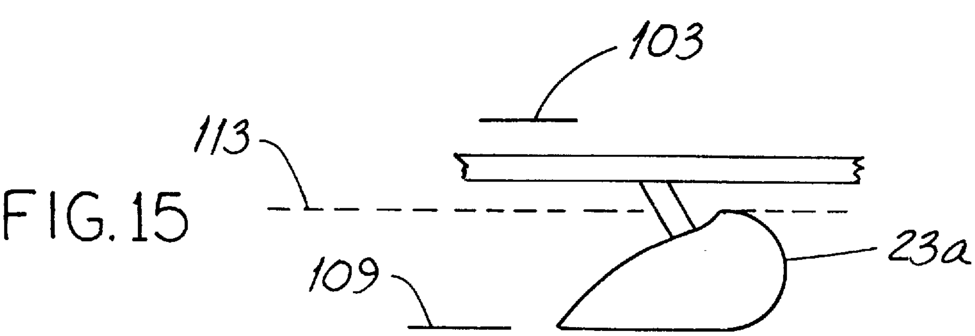

MECHANISM FOR CONTROLLING IMPLEMENT POSITION

FIELD OF THE INVENTION

This invention relates generally to machine elements and mechanisms and, more particularly, to control linkage systems involving handwheels or knobs and used on agricultural tillage equipment to set implement height with respect to the surface of the ground.

BACKGROUND OF THE INVENTION

Towed agricultural implements, e.g., plows and the like, are attached to a tractor using what is known as a 3-point hitch. The hitch, often hydraulically-operated, can be raised and lowered to vary the height of the implement with respect to the surface of the ground.

There are several reasons why it is desirable to vary such height and to repetitively position the implement at a particular height. As an example, when a field is being tilled, it is preferred that the tillage implement engage the ground to the same depth for each "pass" of the implement through the field and to the same depth with respect to the entirety of any particular pass. Planting, time required to till and tractor fuel consumption are all factors which make constant-depth tillage desirable.

And that is not the only reason. A field is prepared to have a tilled portion for crop growing and non-tilled "headlands" at either of two opposed field boundaries. The headlands, covered with weeds, grass or the like, are usually at a somewhat higher elevation than the tilled portion. When the tractor and implement reach the end of a pass at a headland, the implement is raised to "clear" such headland while the tractor is making a U-turn into the next pass.

Since the 3-point hitch raises and lowers relatively slowly, the cumulative time required to repetitively raise and then again lower the implement can have a material effect upon the overall time required to till the field. Therefore, it is desirable to raise the implement to no more than a preselected height, less than its maximum height, to comfortably clear the headland while yet avoiding spending inordinate time in implement raising and lowering.

Still another reason to vary implement height relates to the differing heights used to till and to transport, i.e., move the implement from site to site. When transporting the implement, it is preferred to raise it to its maximum possible height to clear any obstacles in the path of the tractor.

A number of arrangements have been developed to control implement height. Perhaps the earliest was a pivoted lever. Another, more-recent example is disclosed in U.S. Pat. No. 5,261,495 (Szymczak). The Szymczak system is used to control the position of a 3-point hitch and of an agricultural implement connected thereto. The system includes separate, laterally-spaced rotary knobs for selecting, among other parameters, (a) pure position control, draft control or some mix thereof, (b) maximum raised position of the 3-point linkage, and (c) the desired position of the 3-point linkage, presumably at some location below the maximum raised position.

The interface assembly disclosed in U.S. Pat. No. 5,231,892 (Haight) has a turret-like structure in which is fitted a pivot-mounted lever for setting the lowered position of an implement attached to a rockshaft. The lowered position is established by a thumbwheel-positioned abutment which can be defeated (to position the implement at its minimum possible height) by pivoting the lever upwardly over the top of the abutment. When the lever is moved in the raise direction, it can be locked in a transport position by pivoting the lever upwardly over the top of a fixed, projecting tang.

While these prior art mechanisms have apparently been satisfactory for the intended purpose, they are not without some disadvantages. For example, the Haight interface assembly apparently has no provision for setting the raised implement position incrementally below its maximum raised position. And repair of such assembly would seem to be a rather daunting task.

An improved mechanism for controlling implement position which addresses certain shortcomings of the prior art, which is easy to use, which permits an operator to set an intermediate implement position between the corresponding maximum and minimum available positions and which permits tactile operation would be an important advance in the art.

OBJECTS OF THE INVENTION

It is an object of the invention to provide an improved mechanism for controlling implement position which overcomes certain problems and shortcomings of prior art mechanisms.

Another object of the invention is to provide such an improved mechanism which permits an operator to set an intermediate implement position incrementally below the maximum raised position.

Another object of the invention is to provide such an improved mechanism which permits an operator to set an intermediate implement position incrementally above the minimum lowered position.

Still another object of the invention is to provide such an improved mechanism which lends itself to tactile operation, i.e., operation by "touch" without the need to view the mechanism while operating it.

Another object of the invention is to provide such an improved mechanism which is easy to repair. How these and other objects are accomplished will become apparent from the following descriptions and from the drawings.

SUMMARY OF THE INVENTION

Before analyzing the remainder of the specification, it will be helpful to refer to the definitions near the end of the detailed description.

The invention involves a mechanism for controlling position of a hitch-mounted implement. Positions are "controlled" by the mechanism in that an intermediate implement position, anywhere between the implement maximum and minimum positions, can be "set" using the mechanism. And the control knob may be rotated to raise and lower the implement.

The mechanism includes a rotary control coupled to a transducer for movement between first and second positions representing the implement maximum and minimum positions, respectively. In a highly preferred embodiment, the control knob includes a button-like device spring-biased away from the knob rotation axis and mounted for pivoting movement, using finger pressure, toward the axis of rotation. The purpose of the device is described below.

The mechanism also has a separate ring-like position knob mounted for rotation about the same axis of rotation. Such knob has a tang or "stop" which projects inwardly toward such axis. When the button device on the control knob is biased outwardly to the stop-engaging position, the control knob can be rotated in the second or lowering direction only until the button device contacts the stop on the position knob.

And the mechanism also includes structure which sets the maximum limit of travel in either direction of knob rotation. The mechanism includes a circular barrier member mounted with respect to the knobs. Such barrier member has spaced first and second upstanding barriers located in such a way that the button device contacts a respective one of the barriers when the control knob is rotated to its maximum limit of travel in a particular direction. In other words, the control knob and its button device and the barriers cooperate to set the maximum limits of rotary travel of the control knob and to set the maximum limits of raise/lower travel of the implement.

There are circumstances in which the user may need to "bypass" the stop to drop the implement to a morefully-lowered position. When the button device on the control knob is finger-depressed to its bypass position, the device and the stop define a clearance space between them. As the control knob is rotated, the device is able to move past the stop.

And the user may wish to lock the control knob (and, thus, the implement) in a maximum raised position while transporting the tractor to another site. The first barrier includes a pair of upstanding tangs spaced apart by a dimension slightly greater than the thickness (measured circumferentially) of the tongue on the button device. When the tongue is between the tangs, the control knob is prevented from rotating in either direction, thereby retaining the control knob in an implement-transport position.

A primary use for the mechanism is in an agricultural tractor having a control console with a console surface. The position knob includes an annularly-formed, radially-extending lip and the barrier member includes a radially-extending compression member overlapping the lip. When the mechanism is fully assembled, the lip is compressed between the console surface and the compression member and rotation of the position knob is thereby frictionally inhibited. And a particular position of such knob is frictionally retained.

As to positional relationships, the mechanism is preferably mounted in the tractor control console. The transducer, e.g., a rotary potentiometer, is out of sight below the console cover. The barrier member, knurled position knob and control knob are all atop the cover so that either of the knobs may be easily grasped.

Other aspects of the invention are set forth in the following detailed description and in the drawings.

BRIEF DESCRIPTION OF THE DRAWINGS

FIG. 9 is a side elevation view of the mechanism of FIG. 4 with the mechanism mounting console in section. Parts are broke away.

FIG. 14 is a representative side elevation view of a plow and showing the limits of plow travel under certain operating conditions of the new mechanism.

FIG. 15 is a representative side elevation view generally like that of FIG. 14 and showing the limits of plow travel under certain other operating conditions of the new mechanism.

DETAILED DESCRIPTION OF PREFERRED EMBODIMENTS

Figure 1:
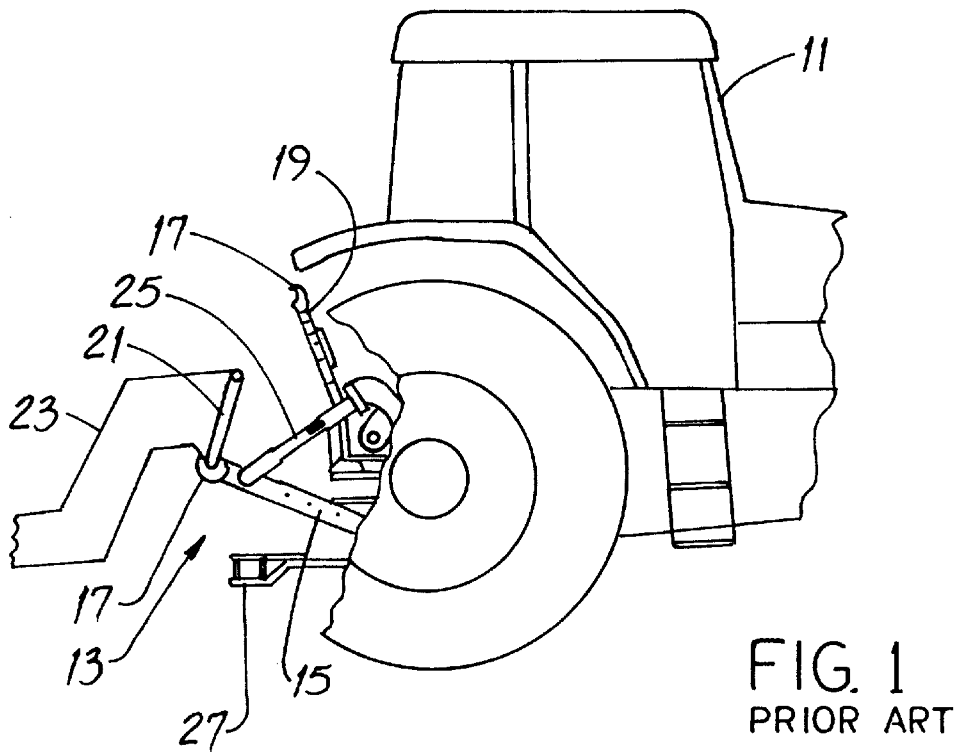
FIG. 1 is a representative elevation view of a tractor having a 3-point hitch and an implement coupled to the tractor by such hitch. Parts are broken away.

Because the new mechanism 10 is used primarily to control the vertical position of an implement attached to a tractor by a 3-point hitch, it will be helpful to have an understanding of some aspects of such a hitch. Referring to FIG. 1, the tractor 11 includes a 3-point hitch 13 having a pair of horizontally-spaced arms or lower links 15, each having an upwardly-opening claw-like hook 17 affixed thereto. The hitch 13 also has an upper arm 19 horizontally centered between the links 15 and having a downwardly-opening claw-like hook 17 affixed thereto.

The hooks 17 of the links 15 and the hook 17 of the arm 19 clamp a structural component 21 of the implement 23 (e.g., a cultivator) therebetween and thereafter, while the implement 23 is in use, move upwardly and downwardly in unison under the urging of a lift link 25. The lift link 25 is moved by a rock shaft, a rotating shaft with levers affixed to it. The tractor 11 and hitch 13 are configured to permit the hitch 13 to be raised to a maximum position or lowered to a minimum position, both with respect to ground level or other reference. (The bolt-and-eye hitch 27 is used for, e.g., towing a wagon.)

Referring next to FIGS. 2 through 9, the new mechanism 10 is depicted in conjunction with the console 29 of a tractor such as that of FIG. 1. Those mechanism components manipulated by the operator include the position knob 31, used from time to time to set an intermediate implement position, and the control knob 33. The knob 33 is coupled to a transducer 35 such as a potentiometer **35*a* and is that knob 33 which is routinely rotated by the operator to position the implement 23. The knobs 31, 33 and the transducer shaft 37 rotate about the same axis of rotation 39**.

The control knob 33 includes a pivoting button device 41 having a downwardly-extending tongue 43. The device 41 is biased radially outwardly by the spring 45 but may be readily depressed inwardly by light finger pressure.

When the device 41 is positioned outwardly, its tongue 43 interacts with a stop 47 on the position knob 31 and with the first and second barriers 49, 51 respectively, of the barrier member 53. And when the device 41 is urged inwardly, the tongue 43 is repositioned to "clear" the stop 47 as the knob 33 is rotated. These features are described more extensively below.

Referring now to FIGS. 2, 3, 4, 7 and 8, the mechanism 10 is fixed with respect to a mount plate 55 embedded in or otherwise attached to the surface of the console 29. Such plate 55 is formed with a shallow pocket 57 that receives a resilient spacer disc 59 and the base portion 61 of the barrier member 53. There are several tapped openings 63 in the plate 55 that receive the screws 65 attaching such barrier member 53. The control knob 33 is atop the barrier member 53 and affixed to the shaft 37 by a set screw or the like.

Referring particular to FIGS. 3, 4, 5, 7 and 8, the position knob 31 is configured with a ring-like body having an angled, knurled outer grasping rim 67. The knob undersurface is annularly formed as a radially-inwardly-extending lip 69 which generally circumscribes an opening 71 to accommodate the disc 59 and the base portion 61.

The finger-like stop 47 is spaced above the lip 69 and extends radially-inwardly toward the axis of rotation. Conveniently, a pointer is on the body and the lip and the pointer are coincident with the same radius. Thus, the pointer gives a visual indication of the rotary position of the lip which, when the mechanism 10 is assembled and in use, is not visible.

The barrier member 53 includes an annular, radially-outwardly-extending compression member 75 sized so that its edge slightly "clears" the wall 77 of the knob 31 so that the member 75 overlaps the lip 69. When the mechanism 10 is assembled, the lip 69 is compressed between the member 75 and the console 29. This arrangement creates friction so that the knob 31 will stay at the selected location. A notch 79 accommodates the stop 47 during assembly.

The barrier member 53 includes an upstanding curved wall 81, the arc length of which is selected in view of the specific transducer 35 used in the mechanism 10 and, probably, other design factors. Such member 53 also includes the barriers 49, 51. The first barrier 49 being comprised of two tangs 83, 85 which are circumferentially spaced apart.

The thickness of the tongue 43 and the spacing between the tangs 83, 85 are cooperatively selected so that the tongue 43 fits between the tangs 83, 85 with slight clearance. As further described below, this feature locks the implement 23 in a transport position. And the cross-sectional shape of the wall 81 and the configuration of the device 41 are cooperatively selected so that the device 41 cannot pass a terminus 87, 89, irrespective of whether the device 41 is pivoted outwardly or inwardly on the knob 33. That is, such configurations require that the device 41 move only in the arc-shaped open region between the terminii 87, 89 and, therefore, that rotation of the control knob 33 be limited to an arc nominally equal to 360° less the arc length of the wall 81.

OPERATION

Figure 2:
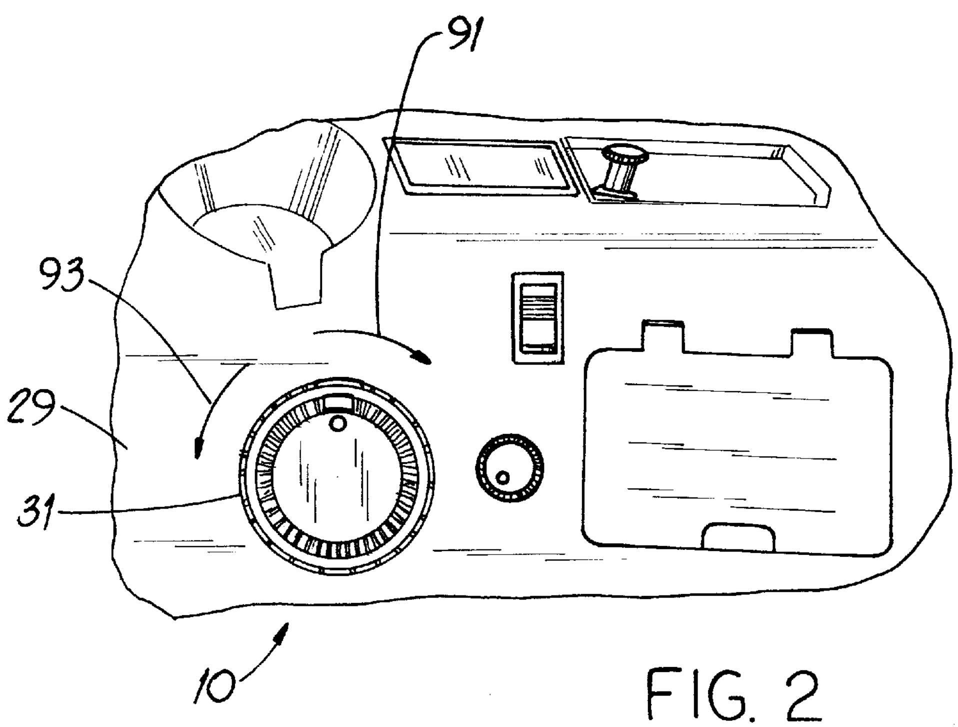
FIG. 2 is a top plan view of an exemplary tractor console in which the new mechanism is mounted.
Figure 3:
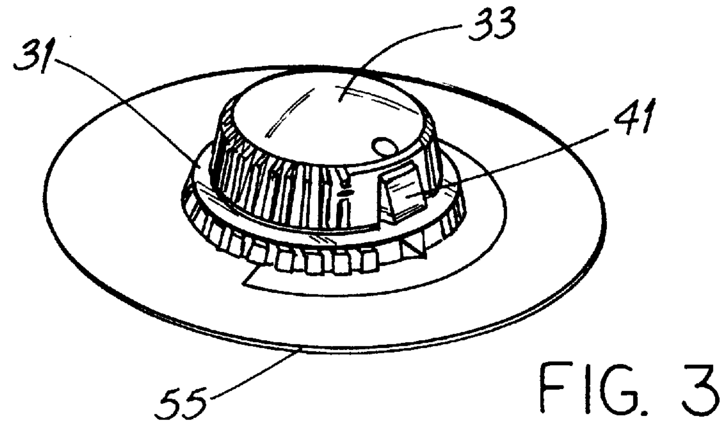
FIG. 3 is a perspective view of certain components of the mechanism.
Figure 4:
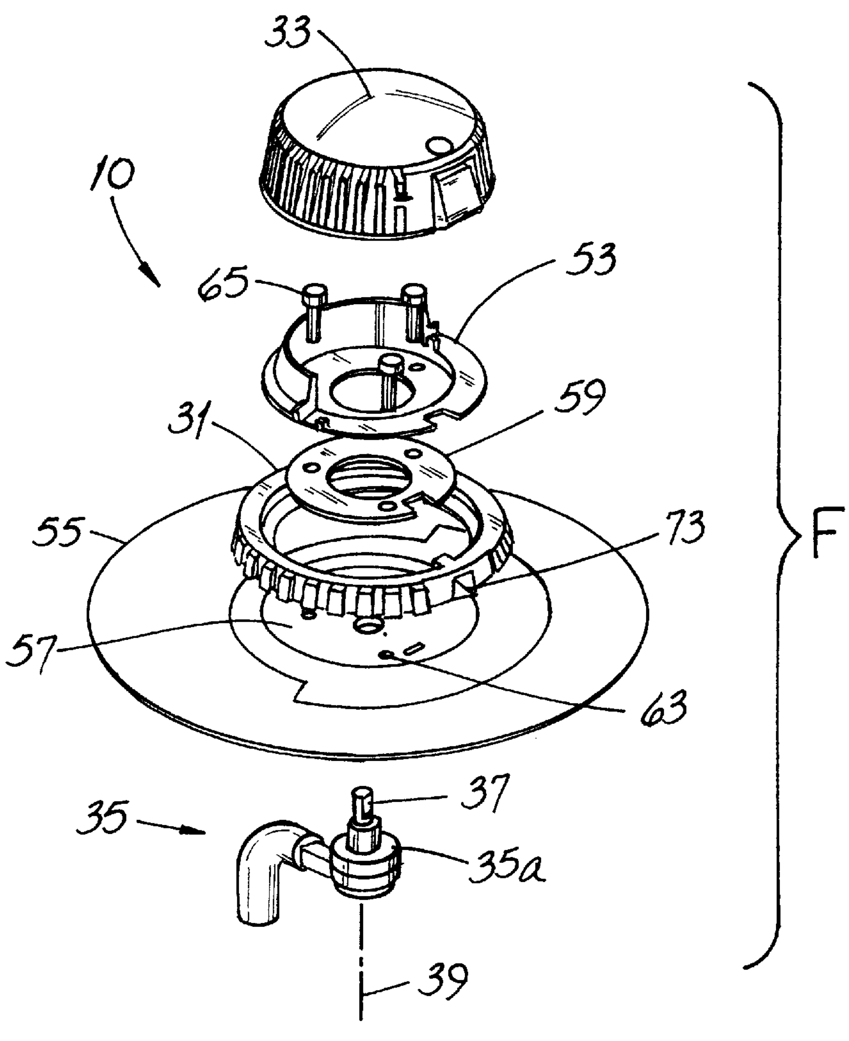
FIG. 4 is an exploded view of the new mechanism.
Figure 5:
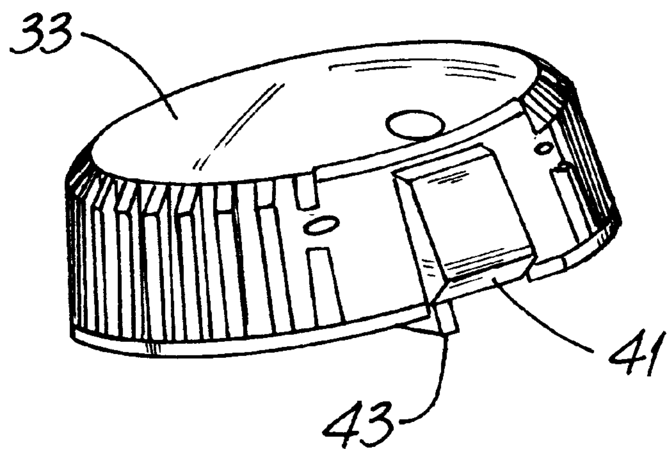
FIG. 5 is a perspective view of the control knob component of the mechanism.
Figure 6:
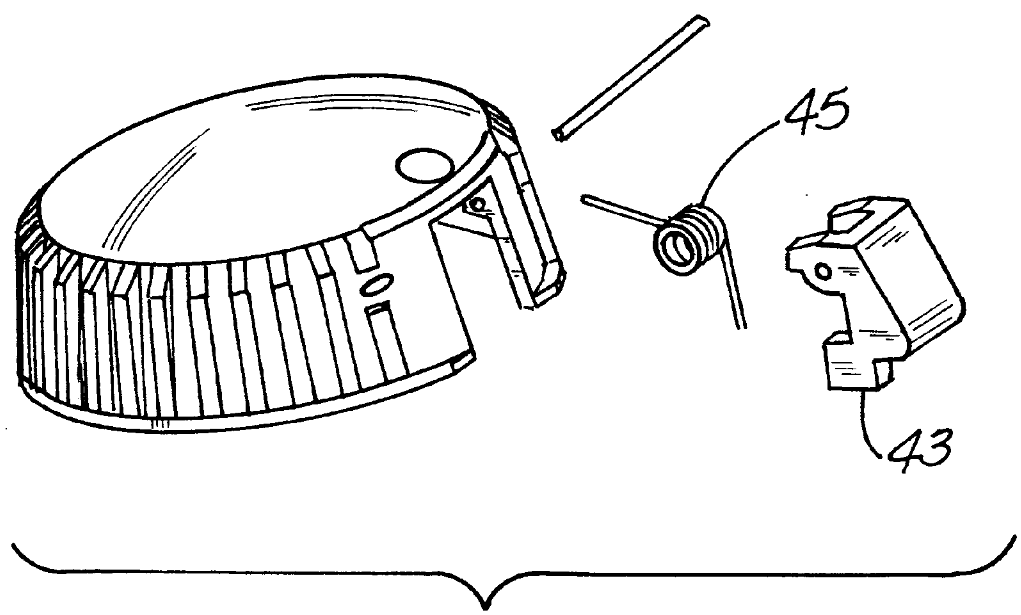
FIG. 6 is a perspective exploded view of the control knob of FIG. 5.
Figure 7:
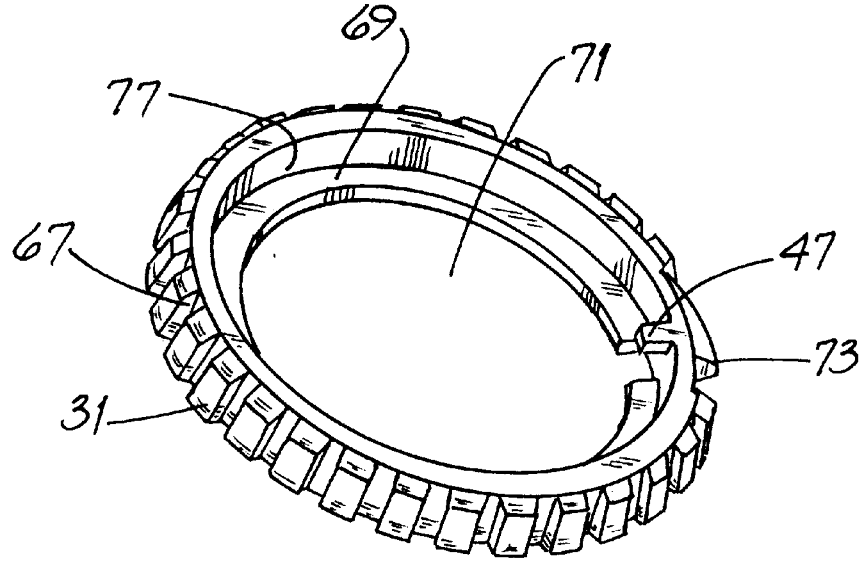
FIG. 7 is a perspective view of the position knob component of the mechanism.
Figure 8:
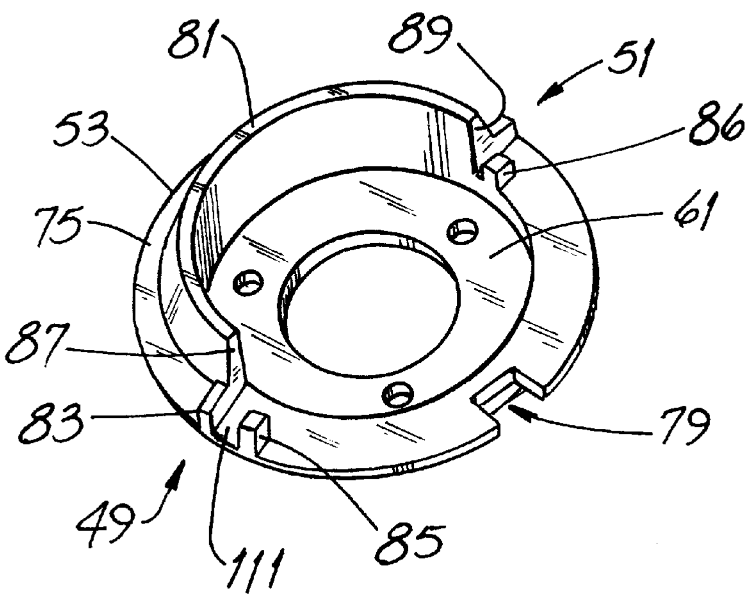
FIG. 8 is a perspective view of the barrier member component of the mechanism.

Before considering the following, it should be appreciated that rotating the knob 33 in the direction of the arrow 91 in FIG. 2 results in an electrical transducer signal which raises the hitch 13 and that rotating the knob 33 in the direction of the arrow 93 results in a transducer signal which lowers the hitch 13. And it is also to be appreciated that for every rotational position of the knob 33, there is a corresponding position of the hitch 13 with respect to the ground.

Figure 10:
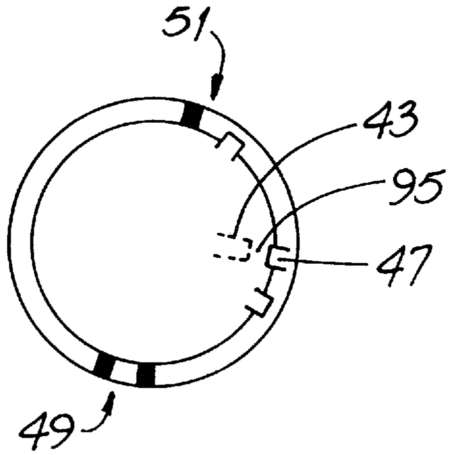
FIGS. 10, 11, 12 and 13 are representative plan views of certain features of the barrier member, the control knob and the position knob showing how those components are used to set the limits of rotative travel of the control knob or lock the control knob in a position, as the case may be.

Referring to FIGS. 4–8 and 10, when no pressure is applied to the device 41, it is spring-biased outwardly and its tongue 43, the barriers 49, 51 and the stop 47 are all coincident with the arc defined by the compression member 75. However, when the device 41 is depressed, its tongue 43 is moved radially inwardly as shown in FIG. 10 in dashed line and there is a clearance space 95 between the tongue 43 and the stop 47. The knob 33 can then be moved freely without regard for the stop 47 or its location.

Referring to all of the FIGURES and, particularly, to FIGS. 10–13, it is assumed that the position knob 31 has been rotated so that the stop 47 is at an intermediate position between the first and second barriers 49, 51, respectively. It is also assumed that the control knob 33 has been rotated (and, if necessary, the device 41 has been manipulated) so that the tongue 43 of the device 41 is between the first barrier 49 and the stop 47.

Figure 11:
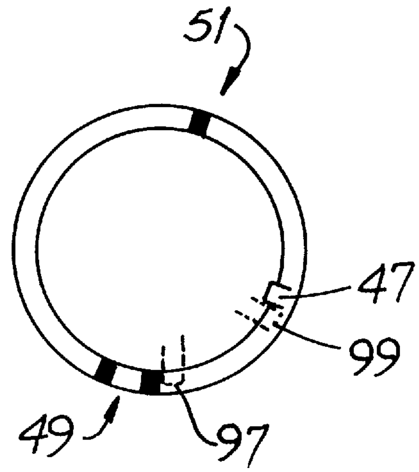

With the device released (i.e., when no finger pressure is applied thereto), the knob 33 can be freely rotated between the first position against the barrier 49, location 97, and an intermediate position against the stop 47, location 99, as shown in FIG. 11. The hitch will "follow" movement of the knob 33 and the implement 23, an exemplary plow 23*a*, will move between its maximum raised position represented by the line 101 in FIG. 14 and its implement intermediate position represented by the line 103 in FIGS. 14 and 15.

Figure 12:
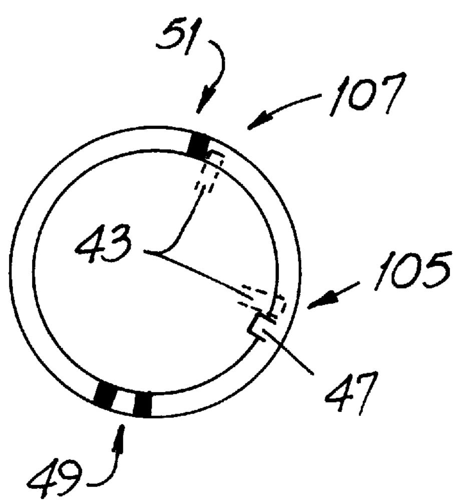
Figure 13:
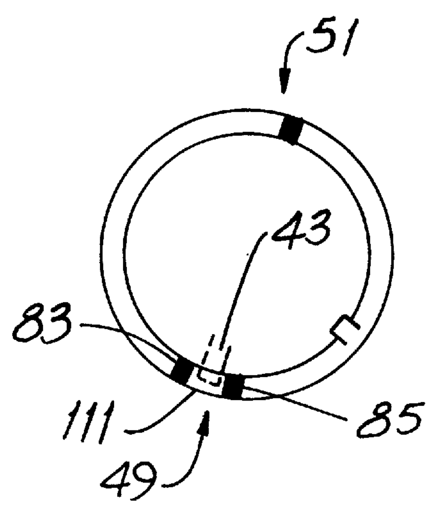

Considering FIG. 12, it is now assumed that the control knob 33 has been rotated and, if necessary, the device 41 has been manipulated so that the tongue 43 of the device 41 is between the stop 47 and the second barrier 51. With the device 41 released, the knob 33 can be freely rotated between an intermediate position against the stop 47, location 105, and a second position against the barrier 51, location 107. The hitch 13 will follow movement of the knob 33 and move between an implement intermediate position represented by the line 103 in FIGS. 14 and 15 and the minimum position represented by the line 109 in FIG. 15.

It will be apparent from the foregoing that the operator can rotate the knob 33 back and forth between the barrier 49 and the stop 47 (FIG. 11) or between the stop 47 and the barrier 51 (FIG. 12) without viewing the knob 33. Operation is tactile in that the operator can feel when the tongue comes to abutment with one of the barriers 49, 51, or with the stop 47, as the case may be.

Considering FIGS. 4, 8, 13, and 14, it is next assumed that the operator wishes to transport the tractor 11 and the implement 23 to another site. To do so, it is preferred that the knob 33 be secured in a transport position. To that end, the device 41 is depressed and the knob 33 rotated clockwise until the tongue 43 is aligned with the gap 111 between the tangs 83, 85. Thereupon, the device 41 is released, the tongue 43 moves into the gap 111 and the knob 33 is prevented from rotating in either direction. (From the foregoing, it is apparent that the implement maximum position and the implement transport position are essentially the same and are represented by the line 101 in FIG. 14.)

As used herein, the phrases "maximum position" and "minimum position" refer, respectively, to the maximum and minimum implement positions with respect to ground level 113 (or some other fixed, generally-horizontal reference) which are possible to be achieved, given the mechanical constraints of the particular tractor 11, hitch 13 and implement 23 under consideration. The phrase "intermediate position" refers to a position between the maximum and minimum positions. And the phrase "implement position" means position with respect to ground level 113.

As used herein, the term "transducer" is used in its commonly-understood sense to mean a device or mechanism which changes an input signal in one form to an output signal in another form. Merely as an example, a potentiometer 35*a*, a type of transducer 35 disclosed herein, changes a rotary mechanical signal into an electrical signal.

As used to described the curved wall 81 of the barrier member 53, the phrase "arc length" means the distance in degrees between two radii, each intersecting the axis of rotation 39 and a respective one of the wall terminii 87, 89.

Terms such as "downwardly," "inwardly" and the like are from the perspective of a viewer of the drawing FIGURES and do not necessarily describe the orientation of parts in an actual mechanism 10.

While the principles of the invention have been shown and described in connection with a few specific embodiments, it is to be appreciated that such embodiments are by way of example and are not limiting.

What is claimed:

1. A mechanism for controlling a position of a hitch-mounted implement, the mechanism comprising:

a control knob having an axis of rotation and being coupled to a transducer for movement with respect to first and second positions representing an implement maximum position and an implement minimum position, respectively, wherein the control knob includes a device mounted for pivoting movement between a stop-engaging position away from the axis of rotation and a stop-bypass position toward the axis of rotation; and a position knob mounted for rotation about the axis and including a stop for limiting rotation of the control knob, thereby setting an implement intermediate position.

2. The mechanism of claim 1, wherein the stop projects radially towards the axis of rotation such that when the device is in the stop-bypass position, the device and the stop define a clearance space therebetween.

3. The mechanism of claim 2, wherein the device is spring-biased toward the stop-engaging position.

4. The mechanism of claim 1, wherein the control knob rotates in first and second directions toward the first and second positions, respectively, and the mechanism further includes a barrier member mounted with respect to the control knob and the position knob and including first and second barriers setting maximum rotation of the control knob in the first and second directions, respectively.

5. The mechanism of claim 4, wherein the first barrier includes a pair of spaced-apart tangs and the device includes a tongue extending therefrom such that when the tongue is between the tangs, the control knob is prevented from rotating, thereby retaining the control knob in an implement-transport position.

6. The mechanism of claim 5, in combination with a tractor having a control console with a console surface and wherein the position knob includes a radially-extending lip and the barrier member includes a radially-extending compression member overlapping the lip so that the lip is compressed between the console surface and the compression member, thereby frictionally inhibiting rotation of the position knob.

7. The mechanism of claim 1, wherein the stop is between the device and the first position, thereby limiting implement travel in an implement-raising direction.

8. The mechanism of claim 1, wherein the stop is between the device and the second position, thereby limiting implement travel in an implement-lowering direction.

* * * * *